United States Patent
Yoshikawa et al.

(10) Patent No.: US 7,841,655 B2
(45) Date of Patent: Nov. 30, 2010

(54) MOTOR VEHICLE SEAT, MOTOR VEHICLE, AND AIRBAG MODULE

(75) Inventors: Hiromichi Yoshikawa, Tokyo (JP); Teruhiko Hiruta, Tokyo (JP)

(73) Assignee: Takata Corporation, Tokyo (JP)

( * ) Notice: Subject to any disclaimer, the term of this patent is extended or adjusted under 35 U.S.C. 154(b) by 634 days.

(21) Appl. No.: 11/692,981

(22) Filed: Mar. 29, 2007

(65) Prior Publication Data
US 2007/0235990 A1    Oct. 11, 2007

(30) Foreign Application Priority Data
Apr. 5, 2006    (JP)    ............. 2006-104695

(51) Int. Cl.
A47C 31/00    (2006.01)
B60R 21/16    (2006.01)
B60R 21/20    (2006.01)
(52) U.S. Cl. ............... 297/216.1; 280/728.2; 280/730.1
(58) Field of Classification Search ............. 297/216.1; 280/730.1, 728.2
See application file for complete search history.

(56) References Cited

U.S. PATENT DOCUMENTS

| 5,439,246 | A  * | 8/1995 | Ravenberg et al. | 280/728.3 |
| 6,935,684 | B2 * | 8/2005 | Sakai | 297/216.1 |
| 7,261,314 | B2 * | 8/2007 | Schneider et al. | 280/728.3 |
| 7,527,286 | B2 * | 5/2009 | Beckley et al. | 280/728.3 |
| 2003/0205890 | A1 * | 11/2003 | Davis et al. | 280/732 |
| 2004/0188986 | A1 * | 9/2004 | Rogers et al. | 280/728.3 |
| 2005/0046156 | A1 * | 3/2005 | Yoshikawa et al. | 280/728.2 |

FOREIGN PATENT DOCUMENTS

| EP | 1 568 537 A1 | 8/2005 |
| EP | 1 623 887 A2 | 2/2006 |
| EP | 1 623 887 A3 | 4/2007 |
| JP | 5-229378 | 9/1993 |
| JP | 10 217818 | 8/1998 |
| JP | 2001 239872 | 9/2001 |

OTHER PUBLICATIONS

A search report dated Jun. 29, 2007, from the European Patent Office in corresponding European Application No. 07103760.0-1523.

* cited by examiner

*Primary Examiner*—David Dunn
*Assistant Examiner*—Tania Abraham
(74) *Attorney, Agent, or Firm*—Fitch, Even, Tabin & Flannery (57) ABSTRACT

A technology is provided effective for suppressing a load received by an airbag housed in a motor vehicle seat with an airbag module having a construction in which the airbag is developed and expanded from a down side to an upside of a seat cushion against movement of a motor vehicle occupant toward a front side of a motor vehicle, which is in a condition seated in the motor vehicle seat when in occurrence of an accident. In one form, the motor vehicle seat according to the present invention is constructed to house an airbag module in a housing portion provided in a seat pan, and to be provided with an airbag cover that intercepts a housing opening of the housing portion and that covers a housing opening side of the airbag.

9 Claims, 5 Drawing Sheets

MOTOR VEHICLE SEAT, MOTOR VEHICLE, AND AIRBAG MODULE

FIELD OF THE INVENTION

The present invention relates to a motor vehicle seat, and more in detail, to a construction technology for a motor vehicle seat, on which an airbag module having a construction in which an airbag is developed and expanded from a downside to an upside of a seat cushion against movement of a motor vehicle occupant toward a front side of the motor vehicle in a seating condition of the motor vehicle occupant in a motor vehicle seat when in occurrence of an accident is mounted.

BACKGROUND OF THE INVENTION

Hitherto, in a seatbelt-wearing condition in which a seatbelt is worn by a motor vehicle occupant seated in a motor vehicle seat, various technologies for blocking occurrence of a phenomenon, i.e., a so-called submarine phenomenon, in which the motor vehicle occupant has a behavior to slip through a downside of a seatbelt along a seat surface, along with a frontward movement of a waist portion of the motor vehicle occupant when in occurrence of an accident, are proposed. For example, in Japanese Unexamined Patent Application Publication No. 5-229378, a motor vehicle seat having a construction in which an expanded airbag compresses a seat cushion from below so as to block the movement of the motor vehicle occupant toward a front side of the motor vehicle at the time of occurrence of the accident is disclosed. However, in designing such a kind of motor vehicle seat, there is a demand for a technology to suppress influence of a load from the seated occupant on the airbag via the seat cushion, in a housed condition of the airbag because the airbag is installed below the seat cushion.

SUMMARY OF THE INVENTION

Accordingly, in the present invention, technology is provided effective for suppressing a load received by an airbag housed in a motor vehicle seat with an airbag module having a construction in which the airbag is developed and expanded from a downside to an upside of a seat cushion against movement of a motor vehicle occupant toward a front side of the motor vehicle in a seating condition of the motor vehicle occupant in the motor vehicle seat when in occurrence of the accident.

In order to solve the aforementioned problems, the present invention is constructed. Incidentally, the present invention can be applied to a construction technology for a motor vehicle seat mounted on various kinds of motor vehicles, such as automobile motor vehicles, trucks, buses, electric trains, boats and ships, and so fourth.

A first form of the present invention for solving the aforementioned problems is a motor vehicle seat mounted on a motor vehicle, and constructed to be provided with at least a left side frame, a right side frame, a bracket, a seat pan, an airbag module, and an airbag cover.

The left side frame according to the present invention is configured to be a seat frame constituting member extending in a front and back direction at a left side below a seat cushion in a seat frame forming a bone structure of a seat. The right side frame according to the present invention is configured to be a seat frame constituting member extending in a front and back direction at a right side below the seat cushion in the seat frame forming the bone structure of the seat. The bracket according to the present invention is configured to be a seat frame constituting member for connecting the left side frame and the right side frame below the seat cushion in the seat frame forming the bone structure of the seat. The bracket, the left side frame, and the right side frame are typically connected by welding or fastening with a bolt and nut. A main body portion of the motor vehicle seat is constructed by the seat frame.

A seat pan according to the present invention is configured to have a construction being disposed between the left side frame and the right side frame below the seat cushion above or at the backside of the bracket in such a manner as to be adjacent thereto, and being provided with an airbag module housing portion at a side opposite to the bracket of which a housing opening is formed. The "seat pan" according to the present invention refers to a member constituting a seat bottom surface of the motor vehicle seat, and specifically, can also be defined as a seat cushion panel, a seat cushion frame, or a seat cushion board each receiving the seat cushion. With regard to a disposing configuration of the seat pan, it is sufficient that the entire or a part of the seat pan is disposed between the left side frame and the right side frame. A construction in which the seat pan is fixed to the left side frame and the right side frame in a manner so as to be hung across by welding, fastening with a bolt and nut, or the like, or a construction in which the seat pan is fixed to a member positioned between the left side frame and the right side frame by welding, fastening with a bolt and nut, or the like, can be adopted. Further, in the present invention, it is sufficient that the seat pan at least includes a portion which is disposed above or at the backside of the bracket in such a manner as to be adjacent thereto. The airbag module housing portion, at the side opposite to the bracket of which the housing opening is formed, is constructed as a portion for housing the airbag module, and specifically, in the airbag module housing portion of the seat pan which is disposed above or at the backside of the bracket in such a manner as to be adjacent thereto, the housing opening is formed toward an upside or a backside of the seat pan.

The airbag module according to the present invention is constructed to include an airbag and a gas generator, and to be housed in the airbag module housing portion, and to be set to resist movement of a motor vehicle occupant toward a front side of a motor vehicle, in a seated condition in a motor vehicle seat when in occurrence of the accident, while causing the airbag to be developed and expanded from a downside to an upside of a seat cushion by supplying the gas for expanding the airbag, which is generated by activation of the gas generator. The airbag module can also be called as "an airbag apparatus" or "an occupant restraining apparatus."

The airbag cover according to the present invention is mounted on the seat pan so as to intercept the housing opening formed at a side opposite to the bracket in the seat pan, and is constructed to serve as a cover member for covering the housing opening side of the airbag housed in the airbag module housing portion in the housed condition. The airbag cover can also be configured to be a component of the airbag module.

Incidentally, as in the motor vehicle seat according to the present invention, in a structure in which an airbag module (airbag) is disposed below the seat cushion, it is supposed that a load from the occupant seated in the seat is affected to an airbag side via a seat cushion, in a housed condition of the airbag.

Therefore, in accordance with the invention according to the first form, an influence, in which the load from the occupant seated in the seat is affected to the airbag via the seat cushion, is configured to be suppressed by adopting the construction to cover the housing opening side of the airbag housed in the airbag module housing portion by means of the airbag cover. Consequently, it becomes possible to suppress the load in which the airbag in the housed condition receives from outside. Thereby, it becomes possible for movement of the airbag to be aimed at being normalized when in occurrence of an accident.

In order to solve the above-described problems, a second form of the present invention is a motor vehicle seat provided with a step portion in the construction according to the first form of the invention. The step portion according to the present invention is constructed as a portion where a difference of elevation with regard to an upper and lower direction is applied to a portion where the seat pan and the airbag cover face each other. Further, the seat pan and the airbag cover are constructed to be latched to each other via the step portion in a mounted condition of the airbag cover.

In the present invention, the step portion can be provided in at least one side of the seat pan and the airbag cover. With regard to a concrete construction of the step portion, the step portion is typically constructed using a concave shape, a convex shape, or the like. For example, a construction in which the seat pan and the airbag cover are latched by means of that the airbag cover is fitted (engaged) into a concave portion provided in the seat pan side, a construction in which the seat pan and the airbag cover are latched by means of that a protrusion of the airbag cover is fitted (engaged) into the groove portion or the hole portion provided in the seat pan side, or the like can be adopted.

In accordance with the above-described construction in the invention according to the second form, an assembling operation performed at a time when the airbag cover is mounted on the seat pan becomes easy.

A third form of the present invention for solving the above-described problems is the motor vehicle seat wherein the cover surface of the airbag cover according to the first or second forms of the invention is constructed to form a smooth surface between the cover surface of the airbag cover and the seat pan surface of the seat pan in the mounted condition of the airbag cover. The smooth surface described here is formed by forming each surface in a continuous manner, namely is formed by that a cover surface of one side continuously follows along a seat pan surface of the other side at a border of an airbag cover surface. The smooth surface may be constructed as a horizontal surface extending in a horizontal manner, or may be constructed as a curved surface.

In accordance with the above-described construction in the invention according to the third form, after mounting the airbag cover onto the seat pan, the smooth surface formed by means of the seat pan and the airbag cover, which is positioned below the seat cushion, prevents forming of an uneven surface at a circumferential portion of the airbag cover. Consequently, a motor vehicle seat not to block a sitting comfortableness for a seated motor vehicle occupant is provided.

A fourth form of the present invention for solving the above-described problems is a motor vehicle including at least the motor vehicle seat according to any one of the first, second, or third forms of the invention, and a seat belt for restraining a motor vehicle occupant seated in the motor vehicle seat. Further, it is constructed that occurrence of a phenomenon, i.e., a so-called submarine phenomenon, in which the motor vehicle occupant has a behavior to slip through a downside of a seatbelt along a seat surface, along with a frontward movement of a waist portion of the motor vehicle occupant when in occurrence of the accident, is blocked in a seat belt wearing condition in which the seat belt is worn by the motor vehicle occupant seated in the motor vehicle seat, by means of the airbag module mounted on the motor vehicle seat.

Accordingly, in accordance with the invention according to the fourth form, a motor vehicle provided with a motor vehicle seat capable of suppressing a load in which the airbag in the housed condition receives from outside is provided.

A fifth form of the present invention for solving the above-described problems is the airbag module having substantially similar to the airbag module serving as a component of the motor vehicle seat according to the first form of the invention.

Accordingly, in accordance with the invention according to the fifth form, an airbag module capable of suppressing a load, in which the airbag in the housed condition receives from outside, is provided.

As described above, according to the present invention, in a motor vehicle seat with an airbag module having a construction in which the airbag is developed and expanded from a downside to an upside of a seat cushion against movement of a motor vehicle occupant toward a front side of a motor vehicle in a seated condition in the motor vehicle seat when in occurrence of the accident, it is enabled to suppress a load in which the airbag in a housed condition receives from outside, by specifically providing an airbag cover for intercepting a housing opening of an airbag module housing portion for housing the airbag module and covering a housing opening side of the airbag.

DETAILED DESCRIPTION OF THE PREFERRED EMBODIMENTS

Figure 1:
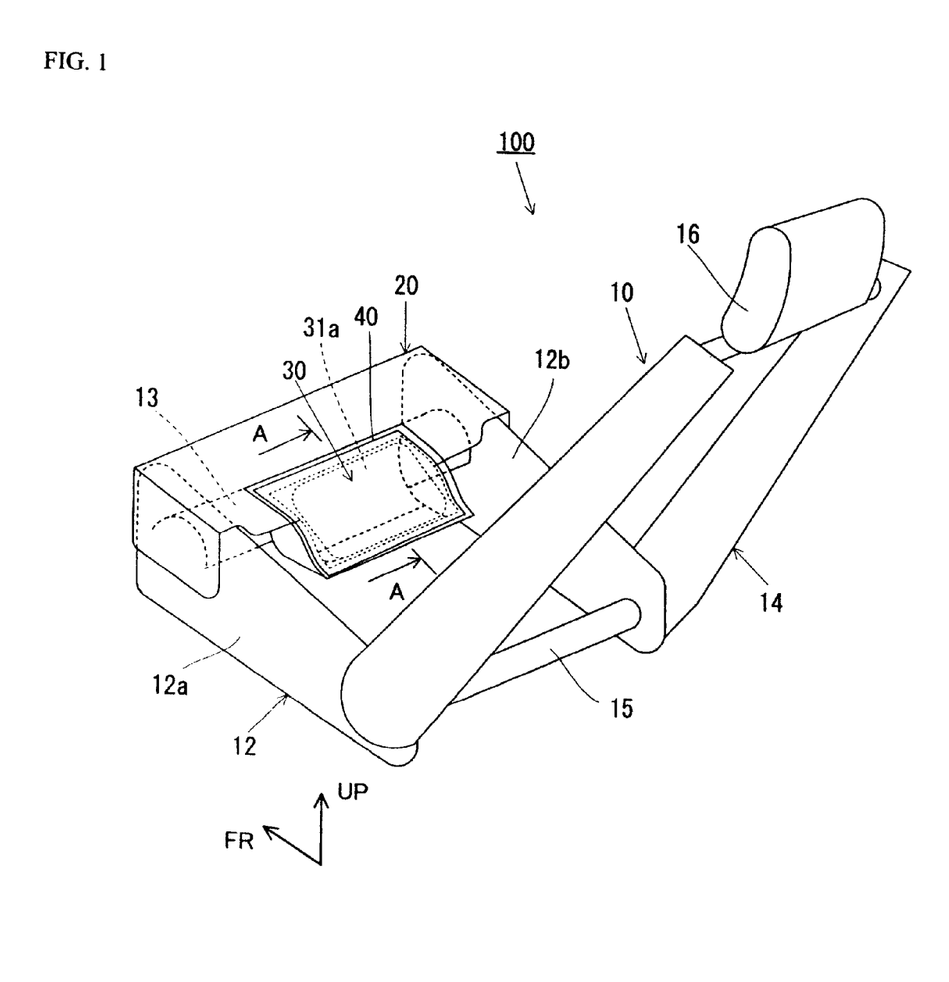
FIG. 1 is a perspective view looking from diagonally back of a motor vehicle showing an internal structure of the motor vehicle seat according to the present embodiment.
Figure 2:
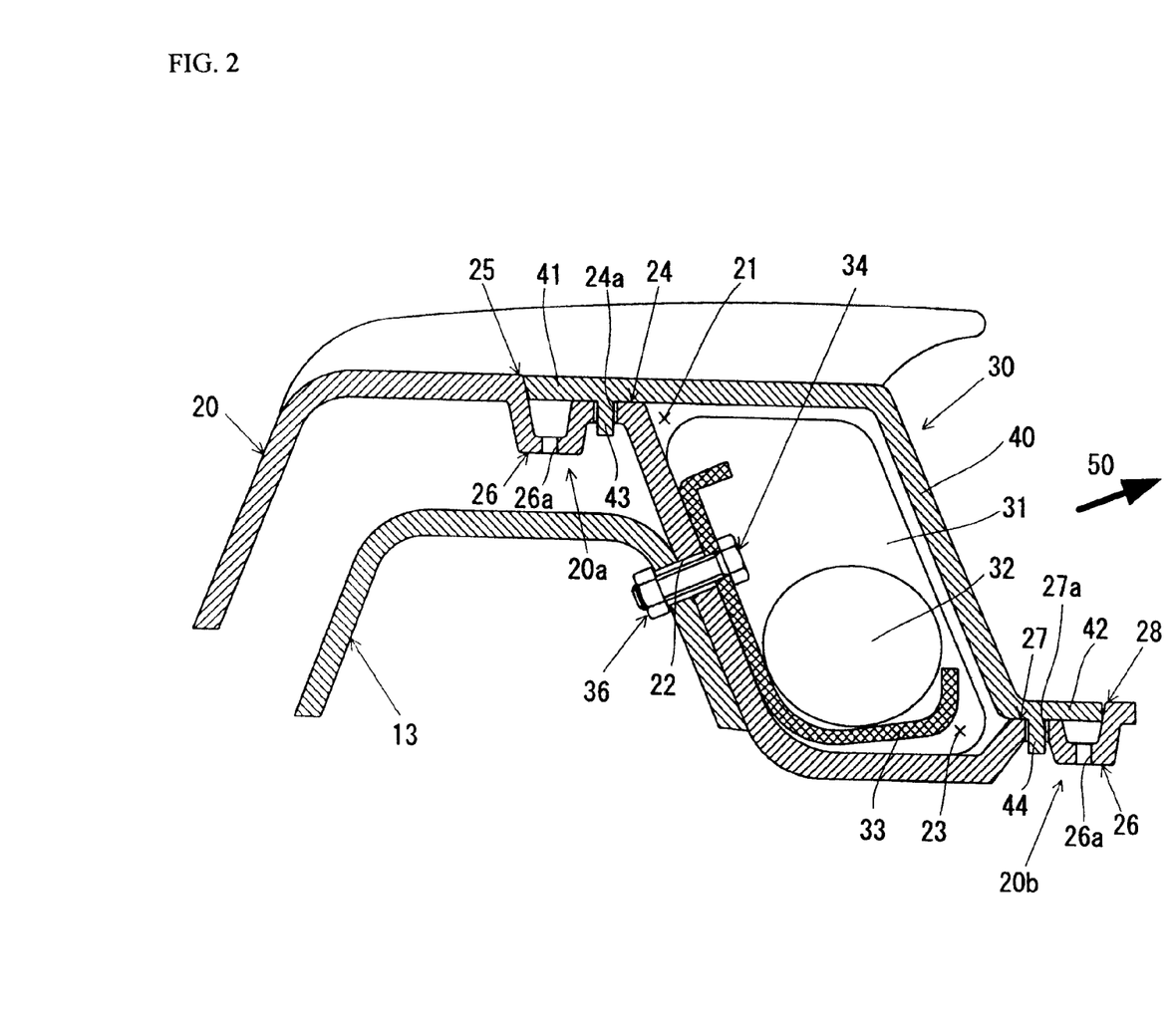
FIG. 2 is a cross-section along a line A-A in FIG. 1.

Hereinbelow, an embodiment of the present invention will be explained in detail referring to the drawings. Firstly, a construction of a motor vehicle seat 100 as an embodiment of a "motor vehicle seat" according to the present invention will be explained with reference to FIG. 1 through FIG. 3. Currently, FIG. 1 is a view showing an internal structure of the motor vehicle seat 100 according to the present embodiment, and is a perspective view looking from diagonal backside of the motor vehicle. Further, FIG. 2 is a cross-section along a line A-A in FIG. 1.

As shown in FIG. 1, the motor vehicle seat 100 according to the present embodiment is a motor vehicle seat to be mounted on a motor vehicle, and is mainly constructed with a seat frame 10, a seat pan 20, and an airbag module 30. The motor vehicle seat 100 is constructed to serve as a driver's seat where a driver is seated, or a passenger seat. Further, in the motor vehicle on which the motor vehicle seat 100 is mounted, a seatbelt (corresponding to a "seatbelt" according to the present invention) to be worn by an occupant seated in the motor vehicle seat 100 is further mounted. Incidentally, a direction indicated by "FR" in FIG. 1 represents a front side of the motor vehicle, and a direction indicated by "UP" represents an upside of the motor vehicle.

The seat frame 10 is constructed to serve as a frame that forms a bone structure portion of the motor vehicle seat 100, and is provided with at least a base frame 12 and a back frame 14. The seat frame 10 corresponds to a "seat frame" according to the present invention. A seat cushion (not shown) formed from a material having plasticity, such as a urethane material, or the like, is mounted on the base frame 12, and the seat cushion constitutes a seat surface of the motor vehicle seat 100. Further, a seat back (not shown) formed from a material having plasticity, such as a urethane material, or the like, is mounted on the back frame 14, and the seat back constitutes a back surface of the motor vehicle seat 100. Furthermore, an outer surface of each of the seat cushion and the back seat is covered with scurf skin (not shown) formed from leather, cloth, or the like.

The base frame 12 is a frame to be disposed below the seat cushion, and is provided with a left-and-right pair of side frames, 12a, 12b (a left side frame 12a, and a right side frame 12b), extending in a front and back direction of the motor vehicle seat 100 (conforming to a front and back direction of the motor vehicle). The currently described left side frame 12a and the right side frame 12b correspond to a "left side frame" and a "right side frame" according to the present invention, respectively.

Further, a bracket 13 for reinforcing is provided so as to be hung across the left and right side frames 12a, 12b at an upper portion side of the base frame 12. The bracket 13 is constructed to be a plate shape (a curved plate shape in FIG. 1) having a predetermined board thickness, and is connected to the left and right side frames, 12a, 12b, by means of a welding process, a fastening process with a bolt and a nut, or the like. This bracket 13 serves as a supporting member for supporting the seat pan 20, and is constructed to serve as a holding member for connecting and holding the left and right side frames 12a, 12b. In addition, the bracket 13 also serves as a positioning member when connecting the left and right side frames 12a, 12b, resulting in providing a good assembling capability. This bracket 13 corresponds to a "bracket" according to the present invention.

The back frame 14 is a frame that is rotatably connected to the base frame 12 via a supporting shaft 15 and a reclining device (not shown). A head rest 16 is attached to a position corresponding to a head portion of a motor vehicle occupant at an upper part of the back frame 14.

The seat pan 20 is provided so as to be hung across the left-and-right pair of the side frames 12a, 12b in a manner so as to cover the left-and-right pair of the side frames 12a, 12b, from an upside thereof above the bracket 13 and at the backside of the bracket 13 in such a manner as to be adjacent thereto. The seat pan 20 is a member constituting a seat bottom surface of the motor vehicle seat 100, and specifically, is also able to be defined as a seat cushion panel that receives the seat cushion, a seat cushion frame, or a seat cushion board. Although described later in detail, the seat pan 20 is attached to the bracket 13 by means of the fastening process with the bolt and nut at two places. The seat pan 20 can also be joined to the left and right side frames 12a, 12b, by means of the welding process, the fastening process with the bolt and nut or the like. The seat pan 20 has a function to receive a load from the seat cushion. The seat pan 20 corresponds to a "seat pan" according to the present invention. In the present invention, the seat pan 20 is sufficient to have at least a portion to be disposed above the bracket 13 or at the backside thereof in a proximal manner.

As shown in FIG. 2, in the seat pan 20, a housing portion 21 for housing the airbag module 30 is provided. The housing portion 21 is provided with a housing opening at a side opposite to the bracket 13, and the housing opening is configured to be directed diagonally upward in a backward direction. The housing opening of the housing portion 21 corresponds to a "housing opening" according to the present invention.

Accordingly, a developing direction (sometimes also called as a protruding direction) of an airbag (an airbag 31, described later) of the airbag module 30 is configured to be directed diagonally upward in a backward direction as indicated by a direction of an arrow 50 in FIG. 2. By means of a holding function (or a positioning function) of the airbag module 30 by the caved portion 23 that is caved downward, housing the airbag module 30 in the housing portion 21 and attaching and fixing the airbag module 30 to the seat pan 20 side is aimed at being facilitated. The housing portion 21 corresponds to an "airbag module housing portion" according to the present invention.

Further, in the present embodiment, an airbag cover 40 is mounted on the seat pan 20 so as to intercept the housing opening formed at the side opposite to the bracket 13 in each of portions of the seat pan 20. The airbag cover 40 is constructed as a cover member for covering a housing opening side (a backside of a diagonal upside) of the airbag (an airbag 31, described later) of the airbag module 30 housed in the housing portion 21 in the mounted condition. Furthermore, the airbag cover 40 allows pressure force of the airbag for pressing the seat cushion upward by means of a developing and expanding operation of the airbag to be applied to the seat cushion when in an operation of the airbag module 30, while the airbag cover 40 protects the airbag housed in the housing portion 21 when in nonoperating time of the airbag module 30. The airbag cover 40 corresponds to an "airbag cover" according to the present invention. Incidentally, the airbag cover 40 may be constituted as a component of the airbag module 30.

According to the construction as described above, by covering the housing opening side of the airbag housed in the housing portion 21 by the airbag cover 40, an influence caused by a load from the occupant seated in the seat to be affected to the airbag via the seat cushion is suppressed. As a result, a load in which the airbag in a housed condition receives from outside, can be suppressed. Consequently, it becomes possible for an operation of the airbag to be aimed at being normalized when in occurrence of an accident.

Moreover, with regard to a mounting operation for mounting the airbag cover 40, the seat pan 20 is constructed to have a flat portion 24 and a step portion 25 in a first area 20a corresponding to a front end portion 41 (a left side end portion in FIG. 2) of the airbag cover 40 in the mounted condition thereof. Similarly, the seat pan 20 is constructed to have a flat portion 27 and a step portion 28 in a second area 20b corresponding to a rear end portion 42 (right side end portion in FIG. 2) of the airbag cover 40 in the mounted condition thereof.

The flat portion 24 provided in the first area 20a of the seat pan 20 is a portion, on which the front end portion 41 of the airbag cover 40 in a condition of being hung across is mounted, and is formed as a continuous contacting surface (sometimes also called as a "contacting surface," a "surface to be hung across," an "overlapping surface," or a "lapping surface") that is overlapping with the front end portion 41. Similarly, the flat portion 27 provided in the second area 20b of the seat pan 20 is a portion, on which the rear end portion 42 of the airbag cover 40 in a condition of being hung across is mounted, and is formed as a continuous contacting surface (sometimes also called as a "contacting surface," a "surface to be hung across," an "overlapping surface," or a "lapping surface") that is overlapping with the front end portion 42.

According to the construction as described above, in the condition of the airbag cover 40 to be mounted (worn condition), by means of that each of the end portions 41, 42, of the airbag cover 40 is overlapping with the flat portions 24, 27, of the seat pan 20 in a surface contact, the airbag cover 40 is to be in close contact with the seat pan 20, and results in being able to improve a close-contact characteristic in the nonoperating time of the airbag module 30. This is effective of preventing dropping off of the airbag cover 40 due to external force. Incidentally, with regard to a length of the overlapped portion (overlapping width) of the flat portions 24, 27, with the airbag cover 40 side, in a case that the close contact characteristic or a dropping-off prevention characteristic with the airbag cover 40 is considered, it is preferable to be set to be equal to or greater than 3 mm, for example. Further, so as to improve the close contact characteristic of the seat pan 20 and the airbag cover 40, it is preferable to provide these flat portions 24, 27, over an entire periphery of the housing opening of the housing portion 21.

Further, it is constructed that in the flat portion 24 provided in the first area 20a of the seat pan 20, a hole portion 24a penetrating in an upper and lower direction is provided, and a protruding piece 43 that protrudes downward from the front end portion 41 of the airbag cover 40 is inserted into the hole portion 24a. Similarly, it is constructed that in the flat portion 27 provided in the second area 20b of the seat pan 20, a hole portion 27a penetrating in an upper and lower direction is provided, and a protruding piece 44 that protrudes downward from the rear end portion 42 of the airbag cover 40 is inserted into the hole portion 27a. A positioning operation of the airbag cover 40 for the seat pan 20 is performed by means of that the protruding piece 43 is inserted into the hole portion 24a and that the protruding piece 44 is inserted into the hole portion 27a.

Furthermore, although not shown, in the present embodiment, the seat pan 20 and the airbag cover 40 in the positioned condition are further fixed to each other by a fastening device, such as rivets, bolt and nut, or the like. Thereby, the seat pan 20 and the airbag cover 40 in the positioned condition are brought to be able to be assuredly fixed.

According to the construction as described above, a provisional placing operation of the airbag cover 40 for an assembling operation becomes easy and it becomes possible to aim at improving workability when in the assembling operation by means of that the hole portion 24a and the hole portion 27a of the seat pan 20 serve as the positioning member for the airbag cover 40. In the present embodiment, although the hole portion 24a and the hole portion 27a are formed to have a penetrating shape, a hole of a non-penetrating shape or a groove can also be applicable in the present invention. Further, with regard to the protruding piece 43 and the protruding piece 44, a rod-shaped pin, a claw-shaped member, or the like can be appropriately used.

Further, in the present invention, in addition to a first construction in which the protruding piece 43 of the airbag cover 40 is inserted into the hole portion 24a of the seat pan 20, and the protruding piece 44 of the airbag cover 40 is inserted into the hole portion 27a of the seat pan 20, a case that a second construction in which the airbag cover 40 and the seat pan 20 are further fixed to each other by means of the fastening device, such as the rivets, the bolt and nut, or the like is used, is described. However, in the present invention, at least one of the first construction and the second construction can be adopted.

The step portion 25 provided in the first area 20a of the seat pan 20 is constructed as a step portion (stepped shape) where a height difference corresponding to a board thickness of the front end portion 41 of the airbag cover 40 with regard to the upper and lower direction (in FIG. 2) is provided. In concrete terms, it is constructed that a rear side is lower than a front side by an extent of the board thickness of the front end portion 41, in each of the portions in the first area 20a of the seat pan 20 by the step portion 25. Similarly, the step portion 28 provided in the second area 20b of the seat pan 20 is constructed as a step portion (stepped shape) where a height difference corresponding to a board thickness of the rear end portion 42 of the airbag cover 40 with regard to the upper and lower direction (in FIG. 2) is provided. In concrete terms, it is constructed that a front side is lower than a rear side by an extent of the board thickness of the rear end portion 42, in each of the portions in the second area 20b of the seat pan 20 by the step portion 28. By providing the step portion 25 and the step portion 28, the seat pan 20 and the airbag cover 40 are latched to each other via the step portion 25 and the step portion 28 in the mounted condition of the airbag cover 40. Further, movement of the front end portion 41 of the airbag cover 40 toward the front side is limited by the step portion 25, and movement of the rear end portion 42 of the airbag cover 40 toward the rear side is limited by the step portion 28. Furthermore, a surface of the seat pan 20 is brought to be in plane with a surface of the airbag cover 40, or to be formed into a smooth surface with a surface of the airbag cover 40. The step portion 25 and the step portion 28 correspond to a "step portion" in the present invention.

According to the construction as described above, by providing the step portion 25 and the step portion 28 in the seat pan 20, the assembling operation in mounting the airbag 40 onto the seat pan 20 becomes easy. Further, after mounting the airbag cover 40 onto the seat pan 20, the smooth surface formed by means of the seat pan 20 and the airbag cover 40, which is positioned below the seat cushion, prevents forming of an uneven surface at a circumferential portion of the airbag cover 40. This enables realizing to form a structure not to block a sitting comfortableness for a motor vehicle occupant seated above the circumferential portion of the airbag cover 40 via the seat cushion. Incidentally, the smooth surface described here is formed by forming each surface in a continuous manner, namely is formed by that a cover surface of one side continuously follows along a seat pan surface of the other side at a border of an airbag cover surface. The smooth surface may be constructed as a horizontal surface extending in a horizontal manner, or may be constructed as a curved surface.

Further, a groove portion 26 is provided over an entire periphery of an opening edge portion (edge portion area of the housing opening) of the housing portion 21 in the seat pan 20. The groove portion 26 is formed at a position outer than the flat portions 24, 27 and lower than the flat portions 24, 27 in the seat pan 20. Moreover, in the groove portion 26, a penetrating hole 26a downwardly formed in a penetrating manner from the groove portion 26 is provided. Incidentally, the groove portion 26 can be partially provided at the opening edge portion of the housing portion 21 as needed.

According to the construction as described above, in the mounted condition of the airbag cover 40, it becomes possible to prevent intruding of a liquid such as water or the like into the housing portion 21 by discharging the liquid such as water or the like intruded from a gap between the airbag cover 40 and the seat pan 20 along the groove portion 26, and further, by actively discharging the liquid flowing through the groove portion 26 toward a downside through the penetrating hole 26a. Specifically, by further providing the penetrating hole 26a upon providing the groove portion 26, an active water-discharging operation can be performed through the penetrating hole 26a, even though the housing portion 21 is in a condition close to a horizontal condition in relation to a floor surface, and it becomes possible to increase a water-discharging effect.

As shown in FIG. 2, the airbag module 30 in the present embodiment includes at least an airbag 31, a gas generator (sometimes called as "inflator") 32, a retainer 33, and a harness (illustration is omitted). The airbag module 30 corresponds to an "airbag module" according to the present invention.

The airbag 31 is folded back in a predetermined folding configuration and housed, and is constructed as an airbag element that is developed and expanded by means of that gas for expanding an airbag, generated by activation of the gas generator 32 when in occurrence of the accident is supplied thereto. In concrete terms, the airbag 31 is developed and expanded from a downside to an upside of a seat cushion against movement of a motor vehicle occupant toward a front side of the motor vehicle in a seated condition of the motor vehicle occupant in a motor vehicle seat when in occurrence of the accident. Thereby, in a seatbelt-wearing condition in which a seatbelt is worn by a motor vehicle occupant seated in a motor vehicle seat 100, a phenomenon, i.e., a so-called submarine phenomenon, in which the motor vehicle occupant has a behavior to slip through a downside of a seatbelt along a seat surface, along with a frontward movement of a waist portion of the motor vehicle occupant when in occurrence of the accident, is blocked or suppressed. The airbag 31 described here corresponds to an "airbag" according to the present invention, and a gas generator 32 corresponds to a "gas generator" according to the present invention.

The retainer 33 is constructed to serve as a member for housing the gas generator 32. The retainer 33 corresponds to a "retainer" according to the present invention. A fixing bolt 34 for attaching and fixing the airbag module 30 to the base frame 12 side is provided in the retainer 33. The airbag module 30 is attached and fixed to the base frame 12 side by means of the fixing bolt 34. In concrete terms, the fixing bolt 34 is configured to be able to be inserted into a penetrating hole 22 penetrating through the seat pan 20, the bracket 13, and the airbag 31, in a condition in which the airbag module 30 is housed in the housing portion 21 of the seat pan 20. Accordingly, three members of the retainer 33, the seat pan 20, and the bracket 13 are integrally formed by being fixed to each other by being fastened together (sometimes called as "fixing by together-fastening") by fastening (screwing) the fixing bolt 34 inserted through the penetrating hole 22, and the nut 36 with each other. In this case, the nut 36 may be constructed as a separate body from the bracket 13, or may have a construction in which the nut 36 is integrally jointed with the bracket 13. Further, a shape of a round hole, a long hole, a slit, or the like can appropriately be selected as the penetrating hole 22.

Incidentally, in the present embodiment, a construction is made such that an extending direction of a bolt axis of the fixing bolt 34 is approximately conformed to a developing direction of the airbag 31 along a direction indicated by an arrow 50 in FIG. 2. According to the construction as described above, it becomes possible that fastening force of the fixing bolt 34 is efficiently used as force against an airbag load when the airbag is developed and expanded.

Although not specifically illustrated, the harness is constructed as a harness for transmitting an activation signal (sometimes also called as a "control signal") to the gas generator 32 when in occurrence of the accident.

Currently, assembling the airbag module 30 according to the present embodiment, namely in concrete terms, housing the airbag module 30 in the housing portion 21 of the seat pan 20 and attaching the airbag cover 40 to the seat pan 20 will be explained referring to FIG. 3 and FIG. 4.

Figure 3:
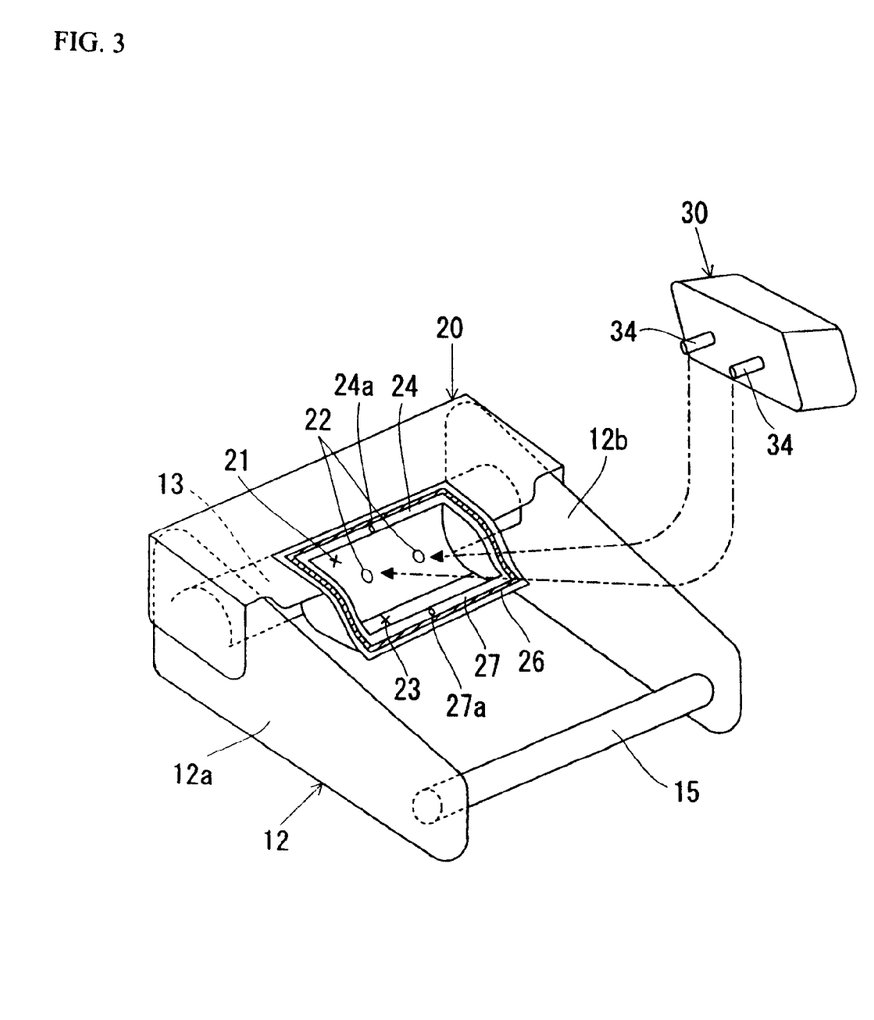
FIG. 3 is a perspective view schematically showing housing an airbag module according to the present embodiment into a housing portion of a seat pan.

FIG. 3 is a perspective view schematically showing the housing of the airbag module 30 according to the present embodiment, into the housing portion 21 of the seat pan 20. As shown in FIG. 3, in housing the airbag module 30, firstly, the airbag module 30 is moved to the housing portion 21 in a manner so as for the fixing bolt 34 at an airbag module 30 side to be headed for the housing portion 21 of the seat pan 20. Then, in a condition of the airbag module 30 whose gas generator 32 side is headed for a down side, the airbag module 30 is housed in the concave portion 23 from above the seat pan 20. Thereafter, the fixing bolt 34 of the airbag module 30 is inserted into the penetrating hole 22, and the fixing bolt 34 and the nut 36 are fastened to each other. Thereby, a condition, in which the retainer 33, the seat pan 20, and the bracket 13 are fastened and fixed together so as to be integrally formed (a condition shown in FIG. 2), is formed. At this moment, by means of that the airbag module 30, the seat pan 20, and the bracket 13 are fastened and fixed together by the fixing bolt 34, pressure generated at the time when the airbag is developed and expanded when in occurrence of the accident, namely a load applied from the airbag module when in operation thereof is received by the seat pan 20 and the bracket 13 being integrally formed by the together-fastening and fixing operation.

Figure 4:
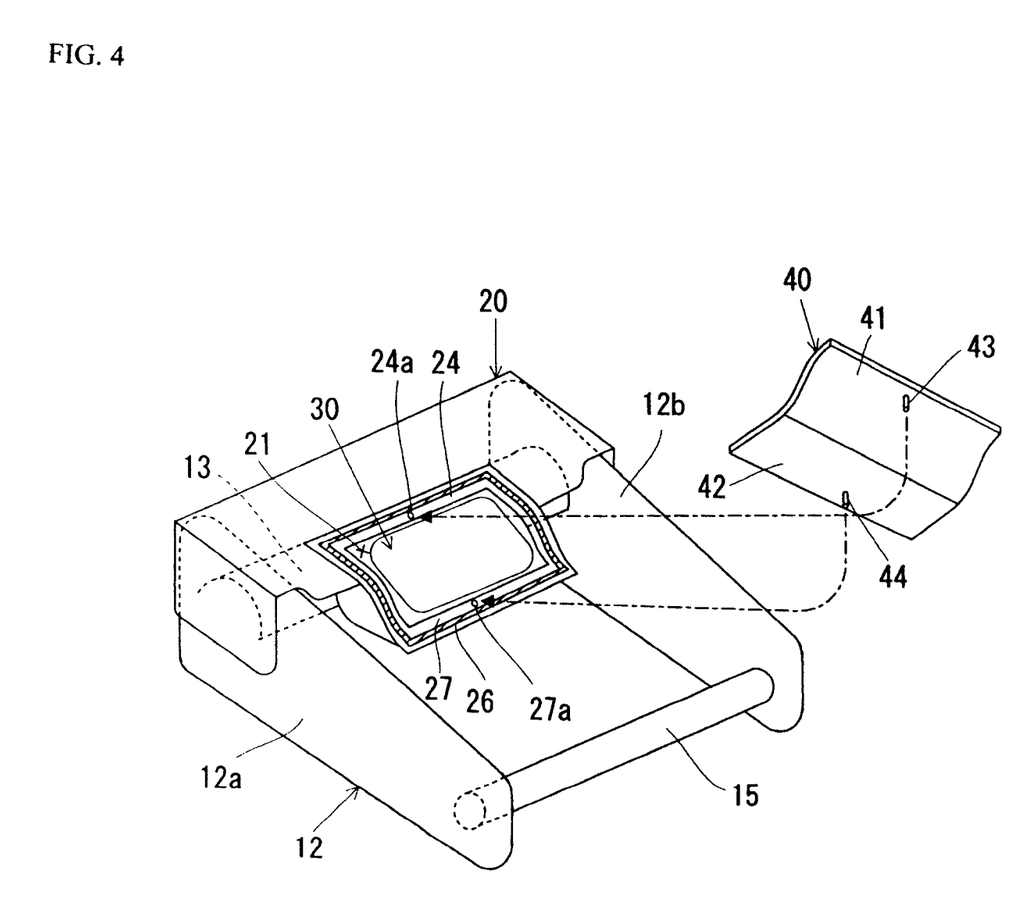
FIG. 4 is perspective view schematically showing attaching an airbag cover according to the present embodiment into the seat pan.

FIG. 4 is a perspective view schematically showing the attaching of the airbag cover 40 according to the present embodiment to the seat pan 20. As shown in FIG. 4, in attaching the airbag cover 40, the airbag cover 40 is moved toward the seat pan 20 in a condition in which the airbag module 30 is housed. Further, the protruding piece 43 provided at a lower surface of the front end portion 41 of the airbag cover 40 is inserted into the hole portion 24a provided in the flat portion 24 of the seat pan 20, and the protruding piece 44 provided at a lower surface of the rear end portion 42 of the airbag cover 40 is inserted into the hole portion 27a provided in the flat portion 27 of the seat pan 20. Thereby, the airbag cover 40 is overlapped on the flat portions 24, 27 of the seat pan 20, and as a result, the airbag cover 40 becomes to be in close contact with the seat pan 20, and by means of a latching function, in which the protruding piece 43 is latched with the hole portion 24a and the protruding piece 44 is latched with the hole portion 27a, it becomes possible to perform the positioning operation of the airbag cover 40 to the seat pan 20. Thereafter, the seat pan 20 and the airbag cover 40, which are in the positioned condition, are further fixed to each other by the fastening device such as a rivet, a bolt and nut, or the like (illustration is omitted).

Incidentally, the present invention is not limited to the aforementioned embodiment, and various applications and modifications are considerable. For example, the following embodiment, to which the aforementioned embodiment is applied, can also be performed.

Figure 5:
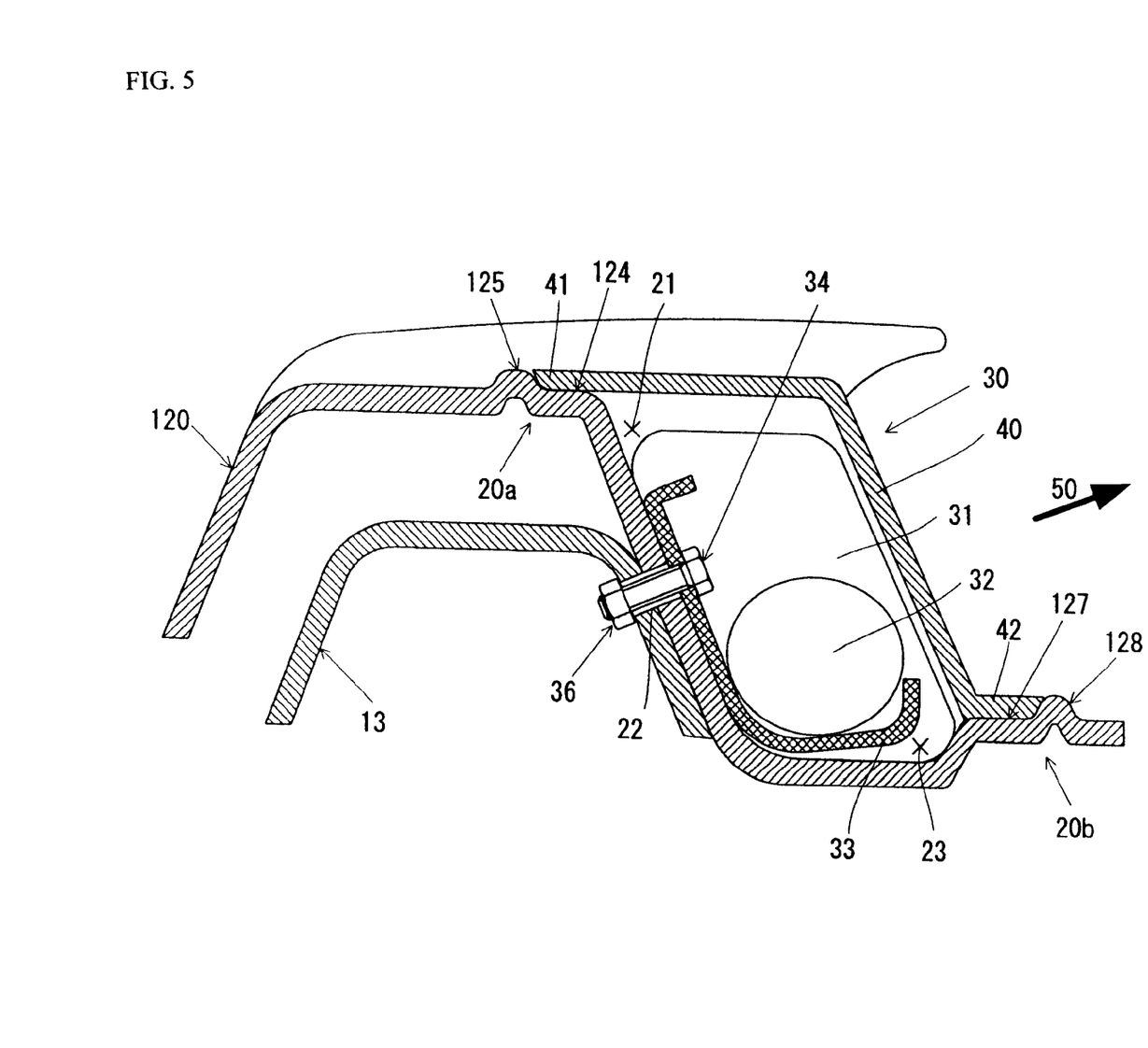
FIG. 5 is a cross-section showing a construction of a seat pan according to another embodiment.

The construction of the seat pan 20 or the airbag 40 according to the aforementioned embodiment can appropriately be changed as needed, and for example, the embodiment shown in FIG. 5 may be adopted.

FIG. 5 is a cross-section showing a construction of the seat pan 120 according to another embodiment. Incidentally in FIG. 5, the same numerals denote the same elements as that in FIG. 2.

In the embodiment shown in FIG. 5, the seat pan 120 is constructed to have a flat portion 124 and a step portion 125 in the first area 20a corresponding to the front end portion 41 (left side end portion in FIG. 5) of the airbag cover 40 in a mounted condition. Similarly, the seat pan 120 is constructed to have a flat portion 127 and the step portion 128 in the second area 20b corresponding to the rear end portion 42 (right side end portion in FIG. 5) of the airbag cover 40 in the mounted condition.

The flat portion 124 and the flat portion 127 in the seat pan 120 in FIG. 5 exert a similar operation and effect as the flat portion 24 and the flat portion 27 in the seat pan 20 in FIG. 2. Namely, by means of that the flat portion 124 of the seat pan 120 is overlapped with the front end portion 41 of the airbag cover 40 and the flat portion 127 of the seat pan 120 is overlapped with the rear end portion 42 of the airbag cover 40, the airbag cover 40 becomes to be in close contact with the seat pan 120. In addition, it becomes possible to improve the close-contact characteristic in a nonoperating time of the airbag module 30, and it is effective for preventing dropping off of the airbag cover 40 due to external force.

Further, the step portion 125 provided in the seat pan 120 in FIG. 5 is formed by upwardly protruding the first area 20a in a manner such that the first area 20a becomes higher by an extent of a board thickness of the front end portion 41 of the airbag cover 40. Similarly, the step portion 128 provided in the seat pan 120 is formed by upwardly protruding the second area 20b in a manner such that the second area 20b becomes higher by an extent of a board thickness of the rear end portion 42 of the airbag cover 40. By providing the step portion 125 and the step portion 128, the seat pan 120 and the airbag cover 40 are latched to each other via the step portion 125 and the step portion 128 in the mounted condition of the airbag cover 40. Further, movement of the front end portion 41 of the airbag cover 40 toward the front side is limited by the step portion 125, and movement of the rear end portion 42 of the airbag cover 40 toward the rear side is limited by the step portion 128. Furthermore, a surface of the seat pan 120 is brought to be in plane with a surface of the airbag cover 40, or to be formed into a smooth surface with a surface of the airbag cover 40. The step portion 125 and the step portion 128 correspond to a "step portion" according to the present invention.

In the construction described above, by providing the step portion 125 and the step portion 128 in the seat pan 120, it becomes easy to perform the assembling when mounting the airbag cover 40 on the seat pan 120. Further, after mounting the airbag cover 40 on the seat pan 120, the smooth surface composed of the seat pan 120 and the airbag cover 40, which is positioned below the seat cushion, prevents forming of the uneven surface at the circumferential portion of the airbag cover 40. This enables realizing to form a structure not to block a sitting comfortableness for a motor vehicle occupant seated above the circumferential portion via the seat cushion.

Incidentally, a structure according to the embodiment shown in FIG. 2 can also be added to the embodiment shown in FIG. 5.

In concrete terms, while providing protruding portions corresponding to the protruding pieces 43, 44, in the airbag cover 40, a construction where portions corresponding to the hole portions 24a, 27a, are provided in the seat pan 120 can be adopted. Further, a construction, in which a concave portion corresponding to the groove portion 26, or a penetrating hole corresponding to the penetrating hole 26a is provided at the opening edge portion of the housing portion 21 of the seat pan 120, can be adopted.

Furthermore, in the aforementioned embodiment, although a construction of the driver's seat where the driver is seated, or a construction of the motor vehicle seat 100 constructed as a passenger seat is explained, the characteristic part of the present invention can also be applied to a construction of various types of motor vehicle seats including the driver's seat or the passenger seat, such as for example, a rear seat. In the motor vehicle in this case, various kinds of motor vehicles moving with the motor vehicle occupant seated thereupon, such as automobiles, airplanes, boats and ships, electric trains, buses, trucks, and so fourth are included.

What is claimed is:

1. A motor vehicle seat comprising:
a seat pan extending laterally between seat side frame portions and supporting a seat cushion thereon;
an airbag housing portion of the seat pan for storing an airbag and having a housing opening through which the airbag is deployed to lift the seat cushion;
a peripheral ledge of the seat pan having vertically offset forward and rearward portions thereof each with a generally flat, horizontal configuration, the peripheral ledge extending about the housing opening of the housing portion;
an airbag cover disposed over the housing opening;
a forward endmost portion of the cover having a flat configuration for seating flush on the ledge forward portion;
a rearward endmost portion of the cover having a flat configuration, being vertically offset from the cover forward endmost portion, and extending generally parallel thereto for seating flush on the ledge rearward portion;
a raised seat pan portion extending about the peripheral ledge for positioning the cover to seat on the ledge with the cover forward and rearward endmost portions adjacent the raised seat pan portion to restrain shifting of the cover in a fore-and-aft direction on the ledge; and
a perimeter groove separating the peripheral ledge and the raised seat pan portion.

2. The motor vehicle seat of claim 1 wherein the cover has a peripheral edge portion including the cover endmost portions that seats on the seat pan ledge and extends beyond the ledge toward the raised seat pan portion.

3. The motor vehicle seat of claim 1 wherein the peripheral ledge forward and rearward portions have a generally flat surface and the cover forward and rearward endmost portions have a corresponding flat surface for seating flush on the flat surface of the peripheral ledge forward and rearward portions.

4. The motor vehicle seat of claim 1 wherein the raised portion extends above the peripheral ledge to a height generally equal to a thickness of the cover.

5. The motor vehicle seat of claim 1 wherein the raised portion extends completely about the cover seated on the ledge.

6. A motor vehicle seat comprising:
a seat pan for supporting a cushion thereon;
an airbag housing portion of the seat pan for storing an airbag and having a housing opening through which the airbag is deployed for lifting the seat cushion;
a generally flat, horizontal peripheral ledge portion of the airbag housing portion extending about the housing opening;
a recessed groove of the seat pan extending about the airbag housing portion and spaced therefrom by the peripheral ledge portion;
a first side wall of the recessed groove having an upper end at which the first side wall is connected to the peripheral ledge portion;

a bottom wall of the recessed groove having an aperture for draining liquid out from the groove;

a second side wall of the recessed groove having an upper end, with the first and second side walls extending up from either side of the bottom wall so that the second side wall extends up higher to its upper end than the first side wall and the peripheral ledge portion connected thereto by a predetermined height difference between the side walls;

a generally flat, horizontal outer seat pan portion connected to the second side wall at its upper end; and an airbag cover sized to fit over the housing opening and having a generally flat peripheral edge portion that is sized and configured to seat flush on the peripheral ledge portion, extend over the recessed groove, and to have a thickness generally equal to the height difference between the first and second side walls so that upper surfaces of the generally flat, horizontal outer seat pan portion and the generally flat peripheral edge portion are generally planar with each other to smoothly engage under the cushion supported thereon.

7. The motor vehicle seat of claim 6 wherein the cover peripheral edge portion includes an outer end seated flush against the second side wall to restrain shifting of the cover on the ledge.

8. The motor vehicle seat of claim 6 wherein the cover is sized to generally completely cover the housing opening.

9. The motor vehicle seat of claim 6 wherein the airbag housing portion includes a first housing sidewall having the airbag mounted thereon and a second housing sidewall opposite the first housing sidewall, wherein the first housing sidewall extends to a greater height than the second housing sidewall such that the housing opening has an angled orientation.

* * * * *